(12) United States Patent
Feldman et al.

(10) Patent No.: US 10,105,909 B1
(45) Date of Patent: Oct. 23, 2018

(54) THREE-DIMENSIONAL MULTIFUNCTIONAL ABLATIVE THERMAL PROTECTION SYSTEM

(71) Applicant: The United States of America as Represented by the Administrator of the National Aeronautics and Space Administration, Washington, DC (US)

(72) Inventors: Jay D. Feldman, Sunnyvale, CA (US); Curt G. Wilkinson, Fleetwood, PA (US); Kenneth J. Mercer, San Diego, CA (US); Ethiraj Venkatapathy, Los Altos, CA (US)

(73) Assignee: The United States of America as Represented by the Administrator of NASA, Washington, DC (US)

( * ) Notice: Subject to any disclaimer, the term of this patent is extended or adjusted under 35 U.S.C. 154(b) by 135 days.

(21) Appl. No.: 15/078,617

(22) Filed: Mar. 23, 2016

Related U.S. Application Data

(60) Provisional application No. 61/967,063, filed on Mar. 23, 2015.

(51) Int. Cl.
| | |
|---|---|
| *B29C 70/24* | (2006.01) |
| *B29C 70/44* | (2006.01) |
| *B29C 71/02* | (2006.01) |
| *B29K 61/04* | (2006.01) |
| *B29K 79/00* | (2006.01) |
| *B29K 309/08* | (2006.01) |
| *B29L 31/30* | (2006.01) |

(52) U.S. Cl.
CPC ............ *B29C 70/24* (2013.01); *B29C 70/443* (2013.01); *B29C 71/02* (2013.01); *B29K 2061/04* (2013.01); *B29K 2079/08* (2013.01); *B29K 2309/08* (2013.01); *B29K 2995/0015* (2013.01); *B29L 2031/3097* (2013.01)

(58) Field of Classification Search
CPC ....... B29C 70/24; B29C 71/02; B29C 70/443; B29L 2031/3097; B29K 2079/08
See application file for complete search history.

(56) References Cited

U.S. PATENT DOCUMENTS

| | | | | |
|---|---|---|---|---|
| 3,724,386 A | * | 4/1973 | Schmidt ................... | B64G 1/58 244/159.1 |
| 4,659,624 A | * | 4/1987 | Yeager ................... | B29C 70/086 156/245 |
| 5,465,760 A | * | 11/1995 | Mohamed ............ | D03D 41/004 139/11 |

(Continued)

OTHER PUBLICATIONS

Quartzel(R) Fused Quartz Textiles Brochure (2007)(Saint-Gobain Quartz).*
JPS Compoite Materials Brochure (uploaded 2015) (JPS Composite Materials, Slater, South Carolina).*

(Continued)

*Primary Examiner* — Michael N Orlando
*Assistant Examiner* — Cynthia L Schaller
(74) *Attorney, Agent, or Firm* — Rhys W. Cheung; Robert M. Padilla; Mark P. Dvorscak

(57) ABSTRACT

A system for fabricating an ablative, 3D fiber-woven thermal protection material, with porosity 0.5-15 percent, reduced thermal conductivity, very low thermal recession, high glass transition temperature, high frontface-backface temperature difference, relatively high mass density, and significant compression strength and tensile strength.

12 Claims, 3 Drawing Sheets

(56) References Cited

U.S. PATENT DOCUMENTS

| | | | | |
|---|---|---|---|---|
| 6,447,886 B1* | 9/2002 | Mohamed | ............ | D03D 25/005 174/255 |
| 6,966,945 B1* | 11/2005 | Mazany | ................ | C04B 28/006 106/600 |
| 2005/0146076 A1* | 7/2005 | Alexander | ........... | D03D 1/0088 264/257 |
| 2005/0186081 A1* | 8/2005 | Mohamed | ................ | B29C 70/24 416/226 |
| 2010/0043908 A1* | 2/2010 | Mohamed | ............ | D03D 25/005 139/384 R |
| 2014/0306164 A1* | 10/2014 | Restuccia | ................ | C08K 3/04 252/511 |
| 2016/0304684 A1* | 10/2016 | Ellinger | ..................... | C08J 5/24 |

OTHER PUBLICATIONS

Feldman, J. et al. "Development of an Ablative 3D Quartz/Cyanate Ester Composite for the Orion Spacecraft Compression Pad", The Composites and Advanced Materials Expo, Dallas, TX Oct. 2016 (15 pages).

Feldman, J. et al. "Development of an Ablative 3D Quartz/Cyanate Ester Composite for the Orion Spacecraft Compression Pad", The Composites and Advanced Materials Expo, Dallas, TX Oct. 2016 (30 pages).

Feldman, J. et al. "Development of 3D Multifunctional Ablative Thermal Protection System for Orion", National Space & Missile Materials Symposium, Chantilly, VA, Jun. 2015.

Feldman, J. et al. "Development of a 3D Composite for NASA's Orion Spacecraft Compression Pad", 249th ACS National Meeting, Denver, CO, Mar. 2015.

\* cited by examiner

THREE-DIMENSIONAL MULTIFUNCTIONAL ABLATIVE THERMAL PROTECTION SYSTEM

CROSS REFERENCE TO RELATED APPLICATION

This application claims the benefit of U.S. Provisional Application No. 61/967,063, entitled "3-Dimensional Multi-Functional Ablative Thermal Protection System," and filed Mar. 23, 2015, which application is hereby incorporated herein by reference in its entirety.

ORIGIN OF THE INVENTION

The invention described herein was made in the performance of work under NASA contracts and by an employee/employees of the United States Government and is subject to the provisions of 51 U.S.C. § 20135 and 35 U.S.C. § 202, and may be manufactured and used by or for the Government for governmental purposes without the payment of any royalties thereon or therefore. In accordance with 35 U.S.C. § 202, the contractor elected not to retain title.

SOURCE OF THE INVENTION

Field of the Invention

This invention relates to a thermal protection material having relatively high density, very low porosity, relatively low thermal conductivity and significant structural capability.

Background of the Invention

The Orion Program is intended to facilitate exploration of space beyond the ISS, extending to the Earth's Moon and to the region between the Earth and Mars. This includes delivering and/or retrieving crew and supplies for the crew, where needed. The Orion Multi-Purpose Crew Vehicle (Orion MPCV) that is anticipated to be used for such purposes will experience several different exploration missions, each with its own challenges. Ideally, a multi-functional, ablative thermal protection system (3DMAT) can be developed to mitigate most or all of the serious atmospheric effects faced by the Orion MPCV. One method of achieving this mitigation is to develop and deploy a very robust thermal protection system (TPS) that is anticipated to meet and overcome the most severe challenges associated with launch, ascent, space transit, entry, and landing associated with each anticipated mission.

For Orion's Exploration Flight Test EFT-1 in 2014, a non-structural, mid-density ablator known as Avcoat formed the majority of the heat shield, which is intended to protect the underlying structure and vehicle from overheating. Several compression pads, up to 11 inches in diameter, in the heat shield are also part of a retention and release mechanism that holds the crew module and service module together for most mission phases. For the first flight test of Orion, EFT-1 in 2014, these compression pads comprised MX4926N, a two dimensional laminate of carbon phenolic.

Because of structural and thermal characteristics, this pad material cannot meet the much higher aerothermal heating and corresponding thermo-structural loading requirements upon re-entry that are anticipated for the deeper space missions in the next 20 years, beginning with the second Orion flight test, scheduled to orbit and return from the Moon in 2018.

A structurally more robust material, which resists delamination and has low thermal conductivity, will be required. What is needed is an ablative TPS material that has very low porosity, relatively high mass density, low thermal conductivity, and resistance to delamination, using an innovative fiber weave pattern and cured resin that resists delamination, and has a glass transition temperature $T_g \geq 193°$ C.

Definitions

The following definitions are used herein. A "fiber volume fraction" refers to a fraction F ($0<F<1$) of a total volume that is occupied by fibers, exclusive of any other material (e.g., resin, voids or pores, etc.). Here, F is as high as about 60 percent. A "total volume" refers to a volume consumed by any and all of fibers, resin, pores, etc. associated with a thermal protection material.

A "fractional fiber loading" refers to a fraction, fx or fy or fz, of a total number of fibers that are oriented parallel to an x-axis, a y-axis, or a z-axis associated with a Cartesian coordinate system. The sum fx+fy+fz is equal to 1.

A "lateral thickness" refers to a length or diameter measured transverse (side-to-side, rather than frontface-to-backface) for a coupon that is being subjected to a heat flux (Watts/cm$^2$) or to a heat load (Joules/cm$^3$) to determine material behavior at high temperatures or high thermal fluxes.

An "exposure time interval" refers to a time interval consumed, during which a material or workpiece is exposed to a controlled temperature or to a controlled heat flux.

SUMMARY OF THE INVENTION

These needs are at least partly met by each of several fiber-plus-resin combinations produced by methods that are disclosed here. Initially, a single continuous fiber of great length (e.g., hundreds or thousands of meters) is arranged in a firm, three dimensional pattern or planar array of segments oriented parallel to an x-axis, parallel to a y-axis and parallel to a z-axis in a Cartesian coordinate system (x,y,z), where the fiber volume fraction is in a range of 40-60 percent of total volume (more preferably, in a range of 55-58 percent), and having a fiber mass density (absent resin) in a range of 1.1-1.4 gm/cm$^3$. A selected resin having a processing temperature in a range T(central)$-\Delta T \leq T \leq$T(central)$+\Delta T$ ($0<\Delta T<20°$ C.; T(central)=T(room) for cyanate ester (EX-1510) or phenolic; T(central)$\approx$285° C. for polyimide), is then pressure-infused into a structure defined by the fiber array to form a fiber-resin combination, in which the fiber appears as a tightly woven, three dimensional, orthogonal array, as illustrated in FIG. 1 for fibers lying in the xz-plane. This combination is cured in a ramp-plateau temperature process (optionally repeated) over a time interval of length several hours, at a maximum temperature in a range T(cure; max1)$\approx$177° C. Optionally, a supplemental (second) curing process is applied to the fiber-resin combination at an approximately constant temperature T(cure;max2)=260° C. for another time interval of length 4-6 hours.

The associated porosity of the resulting fiber-resin combination is as small as 0.5-2 percent for cyanate ester resin (Tencate™ EX-1510) or polyimide resin, or may lie in a different range, 5-15 percent, for phenolic resin, depending upon the resin that is infused. The mass density of the fiber-resin combination is high and may lie in a range of 1.5-1.9 gm/cm$^3$, preferably in a range of 1.7-1.8 gm/cm$^3$.

Two polyimide resins of interest are RTM-370 and PETI-330. Behavior of RTM-370 is described in Kathy C. Chuang et al, "Low melt viscosity polyimide resins for resin transfer molding (RTM) II," High Performance Polymers, SAMPE Symposium, Jun. 3-7 (2007), Baltimore Md. Behavior of PETI-330 is described in J. W. Connell et al, High temperature transfer molding resins: laminate properties of PETI-298 and PETI-330, High Performance Polymers, vol. 15 (2003) 375-394; and in Sayata Ghose et al, "High temperature VARTM of phenylethnyl terminated imides" High Performance Polymers, vol. 21 (2009) 653-672.

DETAILED DESCRIPTION OF THE EMBODIMENTS

The innovative method begins with provision of first, second and third orthogonal arrays of fibers of a selected material, preferably fused quartz fibers with an average fiber diameter in a range 3-12 μm, oriented parallel to xz-, yz-, and xy-planes, respectively. Optionally, the fibers are combined or plied into a plurality of N tows (N=1-12, preferably N=3-12, more preferably N=6), where each tow contains a very large number (e.g., approximately 7,000 segments) that are approximately parallel to each other. In one embodiment, each fiber in a tow has approximately the same length, which may be hundreds or thousands of meters.

Figure 1:
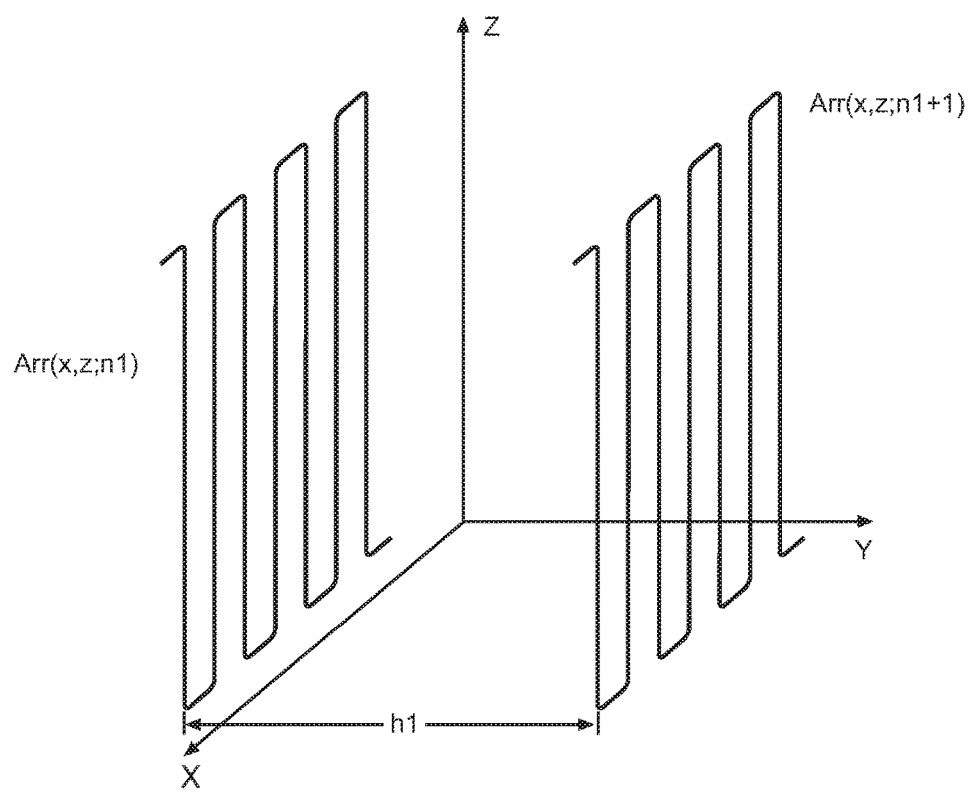
FIG. 1 illustrates a three dimensional fiber array (confined to planes parallel to the xz-plane) that is fabricated according to an embodiment of the invention.

Each first orthogonal array, Arr(x,z;n1) (n1=1, ..., N1), lies in one or more planes parallel to the xz-plane of the coordinate system. N1-1 copies of the first orthogonal array Arr(x,z;n1) are reproduced and arranged in planes parallel to the xz-plane, where two adjacent parallel arrays, Arr(x,z;n1) and Arr(x,z;n1+1), are spaced apart by approximately uniform distances h1, as illustrated in FIG. 1. FIG. 1 Illustrates two parallel arrays, Arr(x,z;n) and Arr(x,z;n+1), that are not connected. In an alternative embodiment, these two (or more) arrays can be connected by a single fiber.

In a similar manner, each second orthogonal array, Arr(y,z;n2) (n2=1, ..., N2), lies in a plane parallel to the yz-plane. N2-1 copies of the second orthogonal array Arr(y,z;n2) are reproduced and arranged in planes parallel to the yz-plane, where two adjacent parallel arrays, Arr(y,z;n2) and Arr(y,z;n2+1), are spaced apart by approximately uniform distances h2 (not shown).

In a similar manner, each third orthogonal array, Arr(x,y;n3) (n3=1, ..., N2), lies in a plane parallel to the xy-plane. N3-1 copies of the third orthogonal array Arr(x,y;n2) are reproduced and arranged in planes parallel to the xy-plane, where two adjacent parallel arrays, Arr(x,y;n3) and Arr(x,y;n3+1), are spaced apart by approximately uniform distances h3 (not shown).

Optionally, fx, fy, and fz are chosen independently. Optionally, but not necessarily, fractional fiber loadings fx, fy, and fz are approximately the same (e.g., 0.333, 0.333 and 0.333). Preferably, the individual fiber segments in each planar array, Arr(x,y;n1), Arr(y,z;n2) and Arr(x,z;n3) are pulled taut. The three overall arrays, {Arr(x,y;n1)}$_{n1}$ and {Arr(y,z;n2)}$_{n2}$ and {Arr(x,z;n3)}$_{n3}$ are combined in a single three dimensional orthogonal array of fibers, referred to herein as Arr(x,y,z).

A supply of a selected resin, such as cyanate ester (Tencate™ EX-1510) or polyimide, at a temperature T1 in a range T(central)−ΔT≤T1≤T(central)$_+$ΔT, with 0≤ΔT≤20° C., where the resin has relatively low viscosity, 150 cP, at T=T(central), is preferably liquid, and is provided adjacent to at least one xz- or yz- or xy-surface of the overall array of fibers Arr(x,y,z). For a choice of cyanate ester resin (EX-1510) or phenolic resin, T(central)=T(room)=20° C. Where the resin of choice is polyimide, T(central) lies in a range, 275° C.≤T(central)≤295° C. For comparison, the viscosity value of water at T=20° C. is about 0.01 P (Poise), and the viscosity of the polyimide at a temperature of about 285° C. lies in a range 1-20 P.

A vacuum source with selected pressure in a range p=0.01-0.1 Pascal (10$^{-4}$-10$^{-3}$ Torr) is initially applied to the overall array Arr(x,y,z) of fibers, to pull the resin into the interstitial regions, where the fibers are not present. As the interstitial regions become occupied by resin, a positive pressure p(int)=690-6900 kPa (100-1000 psi) is required to continue to move the resin into the overall fiber array Arr(x,y,z). At an applied pressure of about 2070 kPa for infusion of cyanate ester resin or a polyimide resin, the porosity of the fiber-resin is between 0.5 percent and 2 percent, and volume ratio of the fibers is about 55-58 percent. Where a phenolic resin is infused, an applied pressure of about 690-6900 kPa will produce a fiber-resin combination with porosity of 5-15 percent. The resulting fiber-resin combination may be provided with a shape as a rectangular parallelepiped or another suitable shape.

Figure 2:
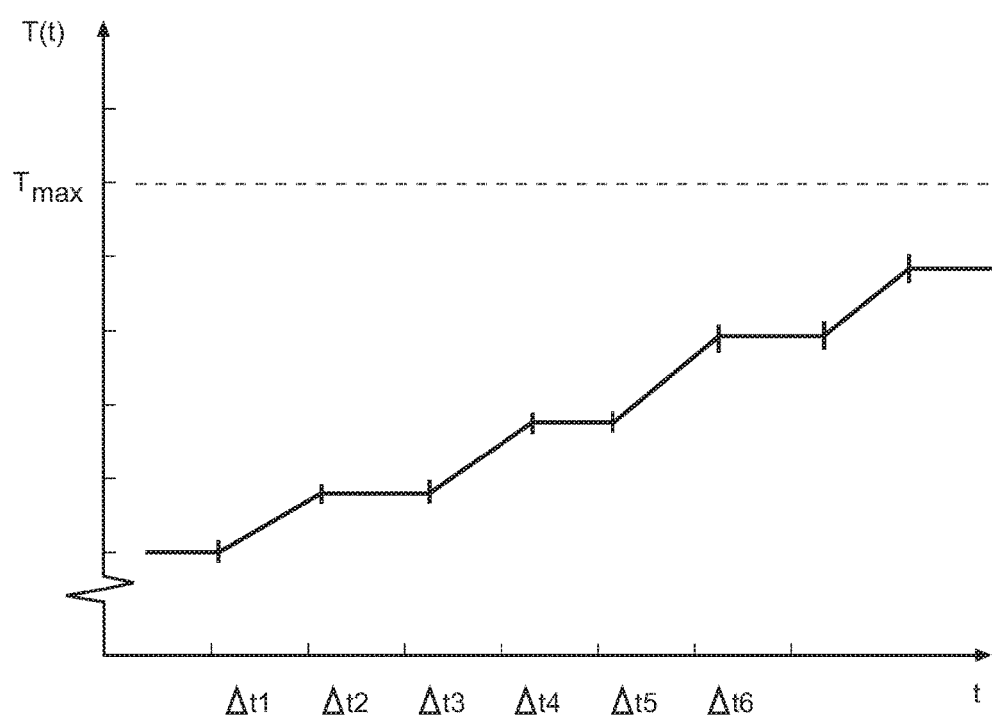
FIG. 2 is a graphical representation of a temperature increase process that is applied in two or more ramp-up and plateau time intervals as part of a resin curing process.

The temperature of the overall array Arr(x,y,z) of fibers and resin is increased in two, three or more ramp-plateau sequences, as illustrated graphically in FIG. 2, with ramp-up time interval lengths, Δt1, Δt3, Δt5, in a range 10-30 min and plateau time interval lengths, Δt2, Δt4, Δt6, in a range 30-180 min, to provide a first curing of the fiber-resin combination. One motivation for this approach is that a cyanate ester resin, such as EX-1510, has an exothermic heat of reaction and must be cured sufficiently slowly to prevent violent overheating. The approach adopted here increases the concentration of the resin (initially 0) in the overall fiber array Arr(x,y,z), then raises the temperature T, allows the temperature to plateau, then repeats the ramp-plateau temperature variation one or more times to reach a first curing temperature in a range 171° C.≤T2≤182° C. Optionally, a supplemental (second) curing of the fiber-resin combination is introduced, similar to the first curing procedure, to reach a final curing temperature in a range 254° C.≤T3≤266° C. The cured fiber-resin combination is optionally reshaped into a desired shape, for example, as one or more rectangular parallelepiped compression pads, for a deep space-and-return mission.

Figure 3:
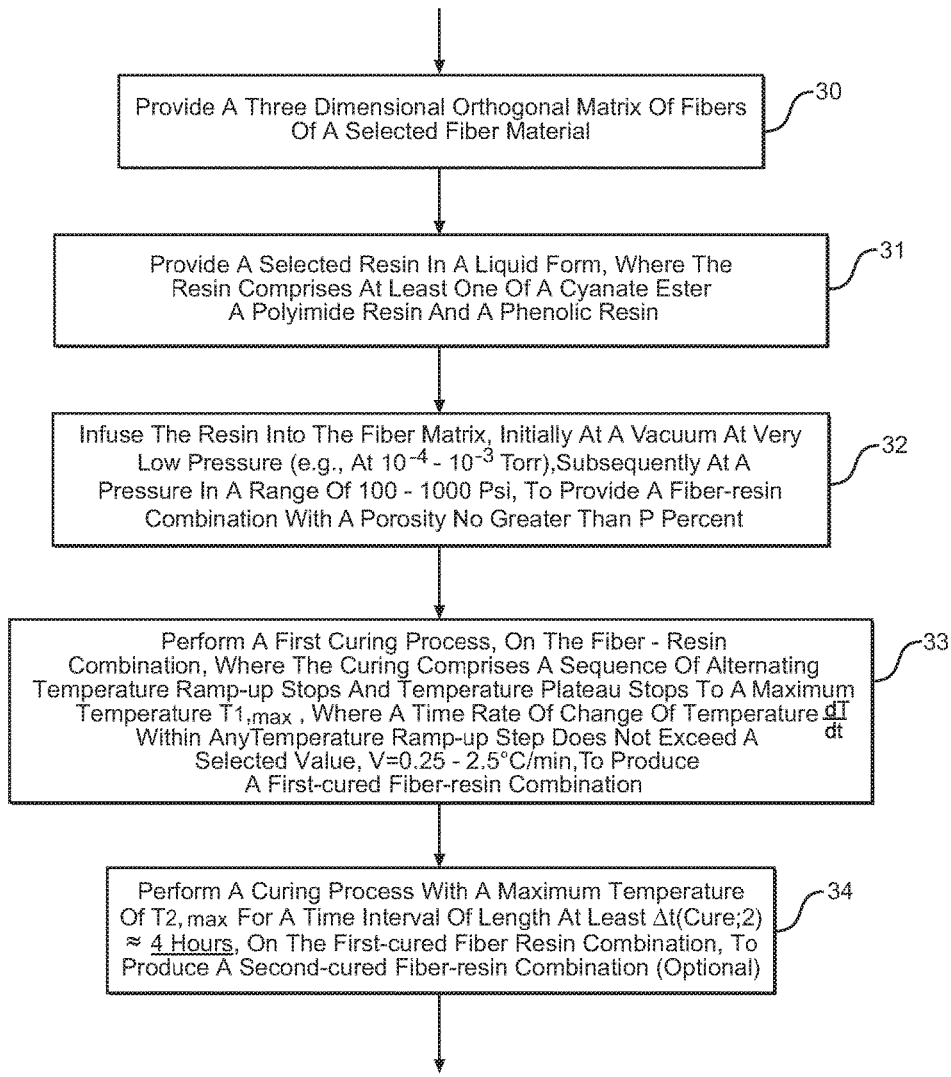
FIG. 3 is a flow chart of a procedure for practicing the invention.

FIG. 3 is a flow chart of an embodiment of a procedure for practicing the invention. In step 30, a three dimensional orthogonal matrix of a selected fiber, preferably fused quartz, is formed as discussed in the preceding, In step 31, a selected resin is provided, preferably cyanate ester (EX-1510) or polyimide (RTM-370 or 330-PETI) or phenolic in a low viscosity form. In step 32, the resin is infused into the 3D orthogonal matrix of fibers, using a vacuum in a range p=0.01-0.1 Pa initially, and subsequently increasing the applied pressure into a range of 690-6900 kPa, until an associated porosity of the fiber-resin combination is reached that lies in a range 0.5-2 percent, for cyanate ester or polyimide, and in a range 5-15 percent, for phenolic. Alternatively, where the resin comprises phenolic, the preceding infusion process can be repeated one, two or more times to reduce the fiber-resin combination porosity to about 5 percent. Thermal conductivity of the resulting fiber-resin combination is relatively low, lying in a range $\kappa \approx 0.6$-$0.7$ Watts/m-° K.

In step 33, a first curing process is performed on the fiber-resin combination. The first curing process comprises a sequence of alternating temperature ramp-up and temperature plateau steps, to a selected maximum temperature $T_{1,max}$, in a range of 171-182° C., where a time rate of temperature change $\partial T/\partial t$ within any temperature ramp-up step does not exceed a selected value in a range, $v=0.25$-$2.5°$ C./min, to produce a first-cured fiber-resin combination.

In step 34 (optional), a supplemental curing process, with a maximum temperature $T_{2,max}$, for a time interval of length at least $\Delta t(cure;2) \approx 4$ hours performed on the first-cured fiber-resin combination, to produce a second-cured fiber-resin combination.

Often, a polyimide is heated to a temperature in a range of T=150-288° C., or until the polyimide viscosity decreases to a range of 1-20 Poise, before infusion of the heated polyimide into whatever will serve as a matrix.

A thermal protection material, produced by a procedure discussed in the preceding, is anticipated to include the following material characteristics. The material: is a tightly woven pattern, comprising a cured resin connected by fibers; (2) has a mass density of at least 1.7 gm/cm$^3$; (3) has reduced thermal conductivity, no greater than about 1 Watt/m-° K; (4) has a glass transition temperature of at least 193° C.; (5) has a differential temperature, defined as frontface temperature minus backface temperature for a material thickness of no more than about 5.7 cm, of at least 1300° C. for an exposure time interval of length about 120 sec; (6) has a thermal recession of about 0 percent for a heat flux of about 205 Watts/cm$^2$, for a pressure of about 55 kPa, and for an exposure time of length about 120 sec; and (7) has a thermal recession no greater than about 5 mm for a heat flux of about 585 Watts/cm$^2$, for a pressure of about 55 kPa, and for an exposure time of length of about 120 sec.

The associated porosity can be as low as about 0.5-2 percent, if the resin comprises Tencate™ EX-1510 cyanate ester resin or polyimide resin RTM-370 or polyimide resin PETI-330, and can be as low as 5-15 percent, if the resin comprises phenolic resin. The elastic modulus and shear modulus of the material have ranges 18,000,000-22,000,000 kPa and 7,000,000-8,500,000 kPa, respectively, if the resin comprises Tencate™ EX-1510 or polyimide RTM-370 or polyimide PETI-330; and have elastic modulus and shear modulus ranges of 20,000-26,000 kPa and 6,500-9,500 kPa, respectively, if the resin comprises phenolic resin. The material can be produced with an associated compression strength and associated tensile strength with ranges of 276,000-380,000 kPa and 342,000-547,000 kPa, respectively.

The material has been, and can be, produced in a contiguous volume of at least 7820 cm$^3$ (e.g., 33 cm×30 cm×7.9 cm). In a conventional approach, a (very large) volume such as this would be hard to produce in at least one direction.

What is claimed is:

1. A method for fabricating an ablative thermal protection material for a spacecraft, comprising:
   combining first, second, and third orthogonal arrays of fibers of a selected material using a three-dimensional orthogonal weave pattern, wherein the combining produces a single three-dimensional orthogonal woven preform with a fiber volume fraction between 55 and 58 percent, the selected material being a quartz yarn; and
   infusing a resin into the single three-dimensional orthogonal woven preform until an associated porosity of a fiber-resin composite between 0.5 percent and 2.0 percent is reached, wherein
   the infusing of the resin comprises
       applying a vacuum source with a selected pressure in a range p=0.01-0.1 Pa to the single three-dimensional orthogonal woven preform, wherein the resin is pulled into interstitial regions where fibers are not present, and
       applying a positive pressure in a range of 690 to 6,900 kPa to move the resin into the single three-dimensional orthogonal woven preform; and
   curing the resin-infused three-dimensional orthogonal woven preform to produce the ablative thermal protection material having a large scale of at least 33 cm×30 cm×7.9 cm.

2. The method of claim 1, wherein the first, second, and third orthogonal arrays of fibers of the selected material are respectively oriented parallel to xz-, yz-, and xy-planes, and
   the first, second, and third orthogonal arrays of fibers of the selected material have associated fractional fiber loadings of fx, fy and fz, respectively, with the fractional fiber loadings of fx, fy and fz lying in a range 0.29-0.40.

3. The method of claim 2, wherein the first orthogonal array of fibers lies in one or more planes parallel to the xz-plane.

4. The method of claim 3, wherein N1-1 copies of the first orthogonal array of fibers are reproduced and arranged in planes parallel to the xz-plane, where two adjacent parallel arrays of fibers are separated by approximately uniform distances h1.

5. The method of claim 2, wherein the second orthogonal array of fibers lies in one or more planes parallel to the yz-plane.

6. The method of claim 5, wherein N2-1 copies of the second orthogonal array of fibers are reproduced and arranged in planes parallel to the yz-plane, where two adjacent parallel arrays of fibers are separated by approximately uniform distances h2.

7. The method of claim 2, wherein the third orthogonal array of fibers lies in one or more planes parallel to the xy-plane.

8. The method of claim 7, wherein N3-1 copies of the third orthogonal array of fibers are reproduced and arranged in planes parallel to the xy-plane, where two adjacent parallel arrays of fibers are separated apart by approximately uniform distances h3.

9. The method of claim 1, wherein the resin comprises cyanate ester or polyimide.

10. The method of claim 9, wherein, depending on the resin, the infusing of the resin is at a temperature ranging between 0 degrees and 20 degrees Celsius or 275 and 295 degrees Celsius.

11. The method of claim 9, wherein the resin has a relatively low viscosity at 150 cP and is provided adjacent to at least one xz-, yz-, or xy-surface of the single three-dimensional orthogonal woven preform.

12. The method of claim 1, wherein depending on the resin, the resin-infused three-dimensional orthogonal woven preform is cured using a predefined temperature-time profile.

* * * * *